(12) United States Patent
Watt et al.

(10) Patent No.: US 10,310,965 B2
(45) Date of Patent: Jun. 4, 2019

(54) DYNAMIC VIRTUAL TESTING ENVIRONMENT FOR WEBPAGES

(71) Applicant: DELL PRODUCTS, LP, Round Rock, TX (US)

(72) Inventors: James S. Watt, Pflugerville, TX (US); Robert J. Perkins, Leander, TX (US); Kareemullah Khan Fazal, Austin, TX (US); Mark D. Owens, Austin, TX (US); Sohail Zakaria, Hinsdale, IL (US)

(73) Assignee: Dell Products, LP, Round Rock, TX (US)

( * ) Notice: Subject to any disclaimer, the term of this patent is extended or adjusted under 35 U.S.C. 154(b) by 121 days.

(21) Appl. No.: 15/053,509

(22) Filed: Feb. 25, 2016

(65) Prior Publication Data
US 2017/0249237 A1    Aug. 31, 2017

(51) Int. Cl.
*G06F 11/36* (2006.01)
*H04L 29/08* (2006.01)
*G06F 16/958* (2019.01)

(52) U.S. Cl.
CPC ........ *G06F 11/3664* (2013.01); *G06F 11/368* (2013.01); *G06F 16/958* (2019.01)

(58) Field of Classification Search
None
See application file for complete search history.

(56) References Cited

U.S. PATENT DOCUMENTS

| 7,627,813 | B2 | 12/2009 | Roser | |
| 7,823,057 | B1* | 10/2010 | Schultz | G06F 17/30887 715/229 |
| 9,031,995 | B1* | 5/2015 | Raden, II | G06F 17/3089 707/802 |
| 2005/0188361 | A1* | 8/2005 | Cai | G06F 8/20 717/148 |
| 2008/0295064 | A1* | 11/2008 | Mitra | G06F 8/20 717/100 |
| 2010/0318894 | A1* | 12/2010 | Billharz | G06F 17/24 715/234 |
| 2011/0145694 | A1 | 6/2011 | Graves et al. | |
| 2014/0129924 | A1* | 5/2014 | Le Bescond de Coatpont | G06F 17/248 715/234 |
| 2015/0120880 | A1* | 4/2015 | Du Laurent | H04L 63/0281 709/219 |
| 2016/0147645 | A1* | 5/2016 | Kandpal | G06F 11/3672 717/124 |

* cited by examiner

*Primary Examiner* — Wynuel S Aquino
(74) *Attorney, Agent, or Firm* — Larson Newman, LLP

(57) ABSTRACT

A test environment as described herein allows for testing webpages prior to deployment to a website. More particularly, a virtual test environment allows a developer to virtually test webpages instantiated from representations of webpages stored in a repository. The webpage representations may be dynamically updated in the repository with changes to the webpages made in the virtual test environment to maintain updated webpage representations in the repository to allow webpages to be tested against updated webpages.

6 Claims, 6 Drawing Sheets

DYNAMIC VIRTUAL TESTING ENVIRONMENT FOR WEBPAGES

CROSS REFERENCE TO RELATED APPLICATIONS

This application is a continuation of U.S. patent application Ser. No. 15/053,540 entitled "Virtual Test Environment for Webpages with Automation Features," filed on even date herewith, the disclosure of which is hereby expressly incorporated by reference in its entirety.

FIELD OF THE DISCLOSURE

The present disclosure generally relates to information handling systems, and more particularly relates to testing webpages prior to deployment in a web environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Websites are increasingly complex and highly coupled-both within themselves, and with other websites and backend servers. Websites are comprised of webpages, and these webpages may have links to other webpages and websites, and further may be in communication with backend servers responsible for directing information to entities for use by the entities. For example, Dell.com is a website hosted on the world wide web to allow users to interface with Dell Corp. of Round Rock Texas. Dell.com is a large scale and complex website with hundreds of interlinked webpages and which provides product support and purchasing options.

SUMMARY

A test environment allows for testing webpages prior to deployment. A webpage is tested in a virtual test environment with regard to webpages instantiated from representations of webpages stored in a repository. The webpage representations may be dynamically updated in the repository with changes to the webpages made in the virtual test environment to maintain updated webpage representations in the repository to allow webpages to be tested against updated webpages.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
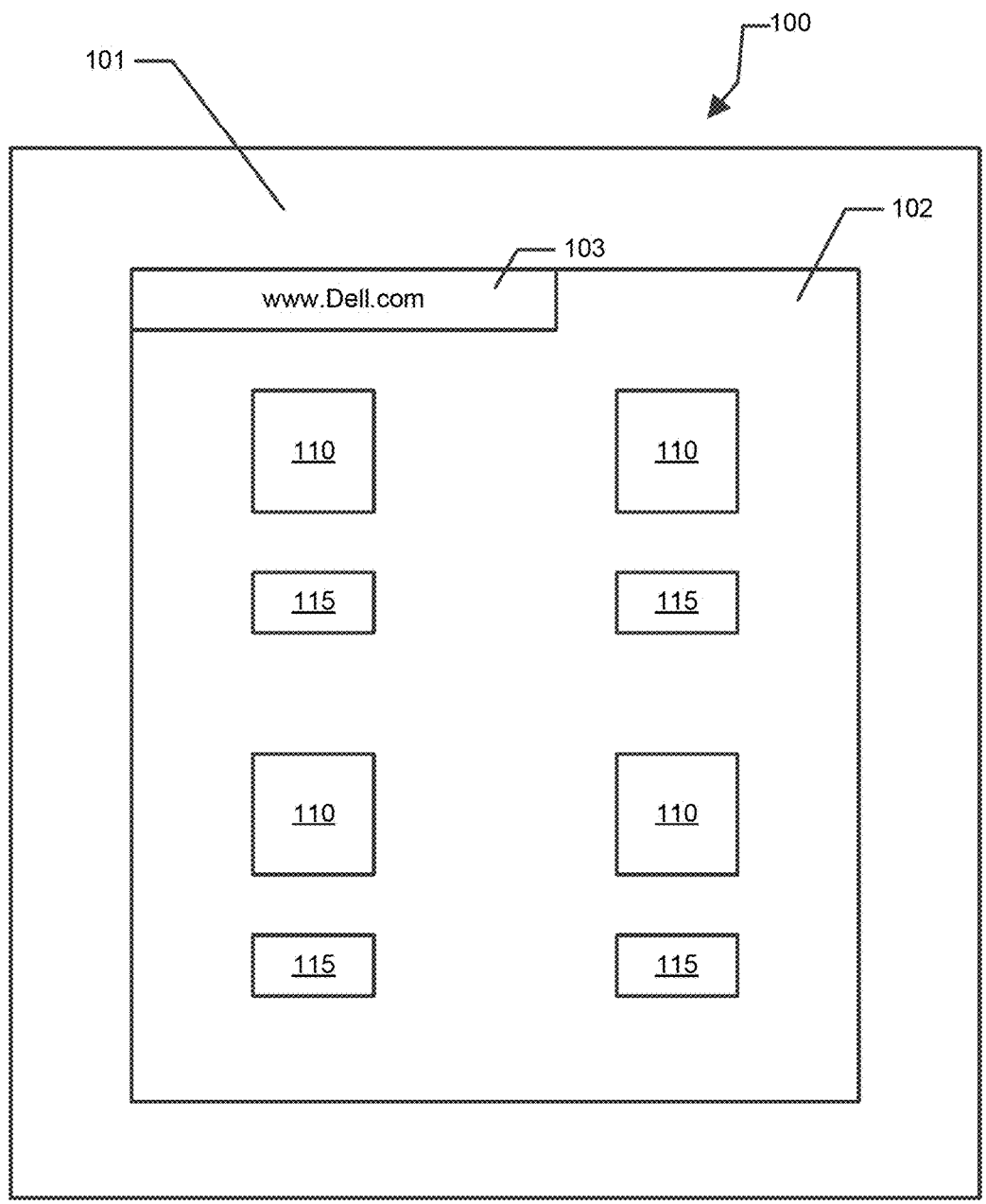
FIG. 1 is a diagrammatic representation of a web environment.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

A website may be generally considered to be a web environment hosting webpages and providing communication channels between web browsers operated by users and backend servers responsible for directing information to entities for use by the entities. Thus a web environment supports webpages and communications. Webpages may provide links to other webpages, media, such as pictures or writing, and other components generally which make up the webpage. Within a web environment, webpages and the components making up webpages may be considered to be deployment components which are deployed on a website to make up the website.

Testing the correctness of deployment components is a significant challenge due to the inherent inter-relation among components when deployed. In a very simple example, on a webpage offering a computer notebook for sale, testing components requires determining if the picture component correctly corresponds to the product number component and if the purchase hyperlink component directs to a component that allows for purchase of a product accurately defined by the product number. To try to ensure correct webpages, components of webpages and links between webpages, website developers have resorted to long test cycles and stability windows in which webpage changes are frozen. Furthermore test and hosting environments exist in separate spaces: for example, a webpage development team may test webpages, for example, by reviewing the code for the webpages and viewing the webpages, prior to deploying the webpages for hosting. Thus, there is only an approximation of the correct relations between the deployed components prior to deployment, such that upon deployment it may be discovered that there are errors in the interrelations and dependencies among deployed components-manifested in the webpage errors users often experience when browsing a website.

According to embodiments disclosed herein, to test deployment components such as webpages, webpages and components of webpages may be tested prior to webpage deployment via a virtual test environment. The virtual test environment may include a representation of components associated with a webpage. For example, a virtual test environment may provide virtual connections for a webpage under test based on the component links of the webpage so that the validity of the links on the webpage may be tested in the virtual test environment. A repository of the virtual test environment may maintain information on webpages associated with the virtual connections of the webpage under test so that the virtual test environment associates updated webpages with the respective hyperlinks of the webpage under test to allow for test of how the webpage under test will interface with associated webpages.

FIG. 1 shows a web environment 100 that includes website 101 having a webpage 102. Webpage 102 includes a webpage address 103, and media components 110, and hyperlink components 115 associated with the respective media component. Hyperlink components 115 link webpage 103 to other webpages.

Figure 2:
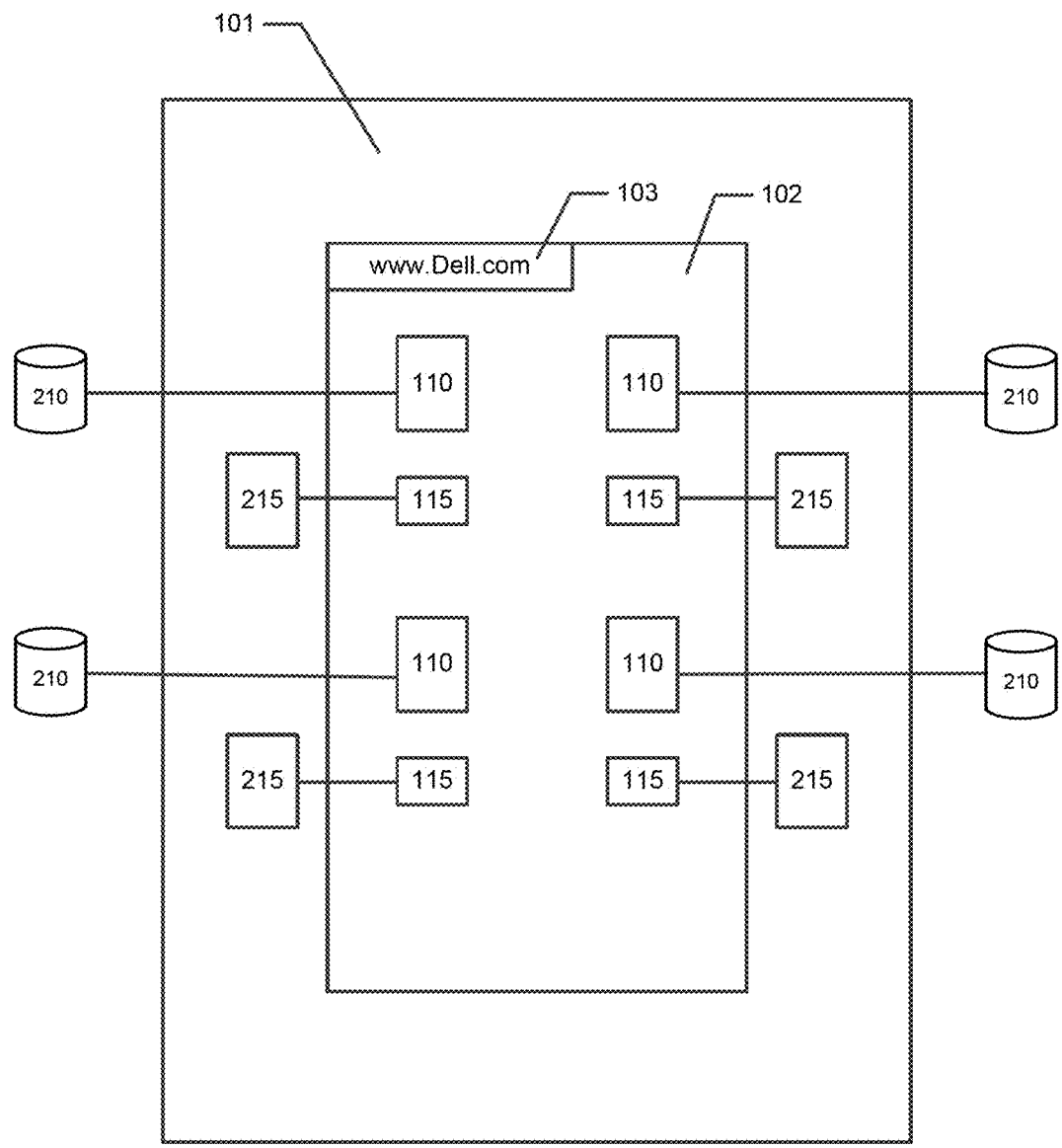
FIG. 2 is a diagrammatic representation of a website.

FIG. 2 shows media components 110 that may be provided to webpage 102 by media component repositories 210, which may be the same or different repositories. Hyperlink components 115 link to other webpages 215 of website 101.

Figure 3:
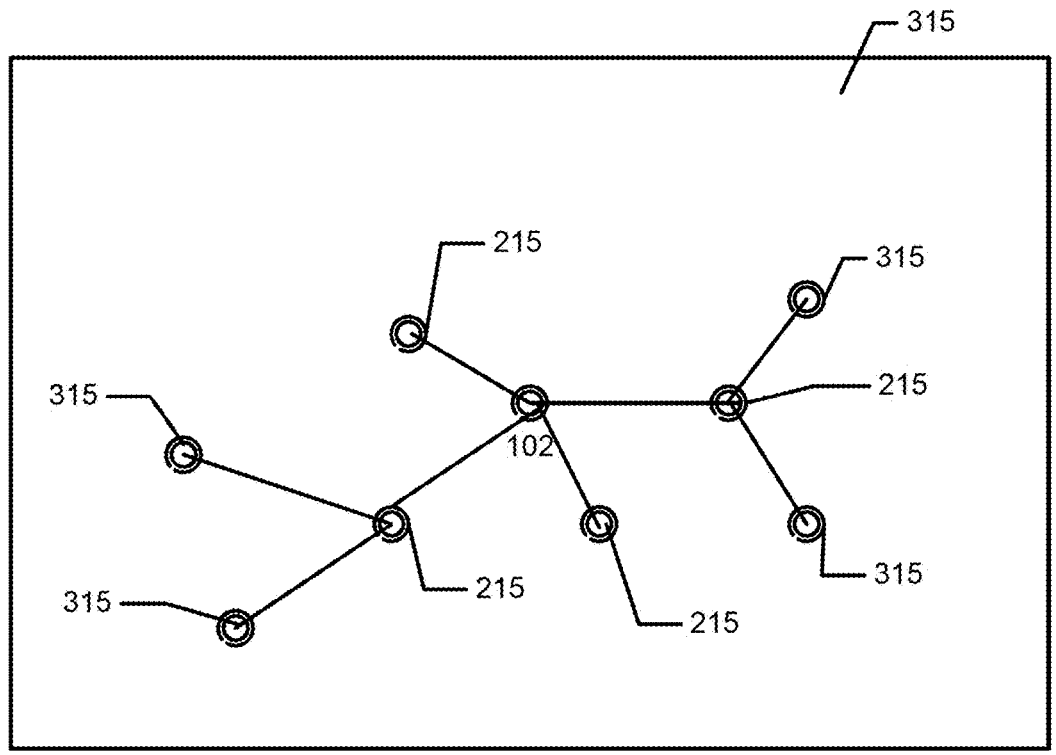
FIG. 3 is a diagrammatic representation of relationships between webpages.

FIG. 3 shows relationships or links between webpages of website 101. Webpage 102 links to webpages 215, and some of webpages 215 in turn have hyperlinks to webpages 315, which may also have hyperlinks to other webpages. Each of webpages 102, 215, and 315 may communicate with one or more servers hosting website 101, and content may be provided to webpages 102, 215, and 315 from the servers or from one or more databases or other repositories.

Webpage 102 includes link components directly linking webpages 215. Thus, webpage 102 is directly linked or connected to webpages 215 with hyperlink components. Webpage 102 is indirectly linked to webpages 315 via webpages 215 and the connections between webpage 102 and webpages 215, and the connections between webpages 215 and webpages 315. For purposes of testing webpages, a test environment may test webpages by testing the direct links between webpages. Thus, a webpage under test can be tested with regard to webpages in direct connection to the webpage under test. That is, a webpage under test may only need to be tested against webpages referenced by link components of the webpage to test the correctness of the webpage.

A representation of a webpage such as webpages 102, 215, and 315 may be stored in a repository as a template. Such a template may be a template including html code defining the particular webpage associated with the particular template. The template may further define an application, operating system, and configuration associated with the webpage. The template may be versioned with different versions in a template library of the repository.

Figure 4:
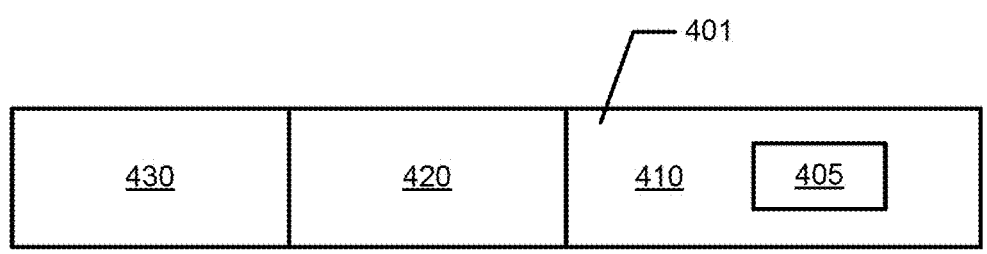
FIG. 4 is a diagrammatic representation of an example template representing a webpage.

FIG. 4 shows a template 401 representing a webpage such as webpage 102. Template 401 includes application information 410, configuration information 420, and operating system information 430. A template such as template 401 may be stored in a repository for each webpage of a website. The template may be versioned, and there may be triggers which indicate changes to the templates when a template is stored in the repository or updated. Application information 410 may include webpage information 405. Webpage information 405 may include information defining a specific webpage, such as media components, hyperlink components, and other components, for example.

A test environment accessing the repository of webpage templates may allow a user to test a webpage by retrieving the content and templates representing webpages directly associated with the webpage under test, virtually instantiating the content and webpages, and allowing a webpage developer to virtually test the functionality of the webpage under test with other webpages in the virtual test environment. More particularly, in the virtual test environment, a representation of a webpage under test may be instantiated from the template representing the webpage under test stored in a repository. Similarly, webpages referenced by link components of the webpage under test may be instantiated from respective templates stored in the repository.

Figure 5:
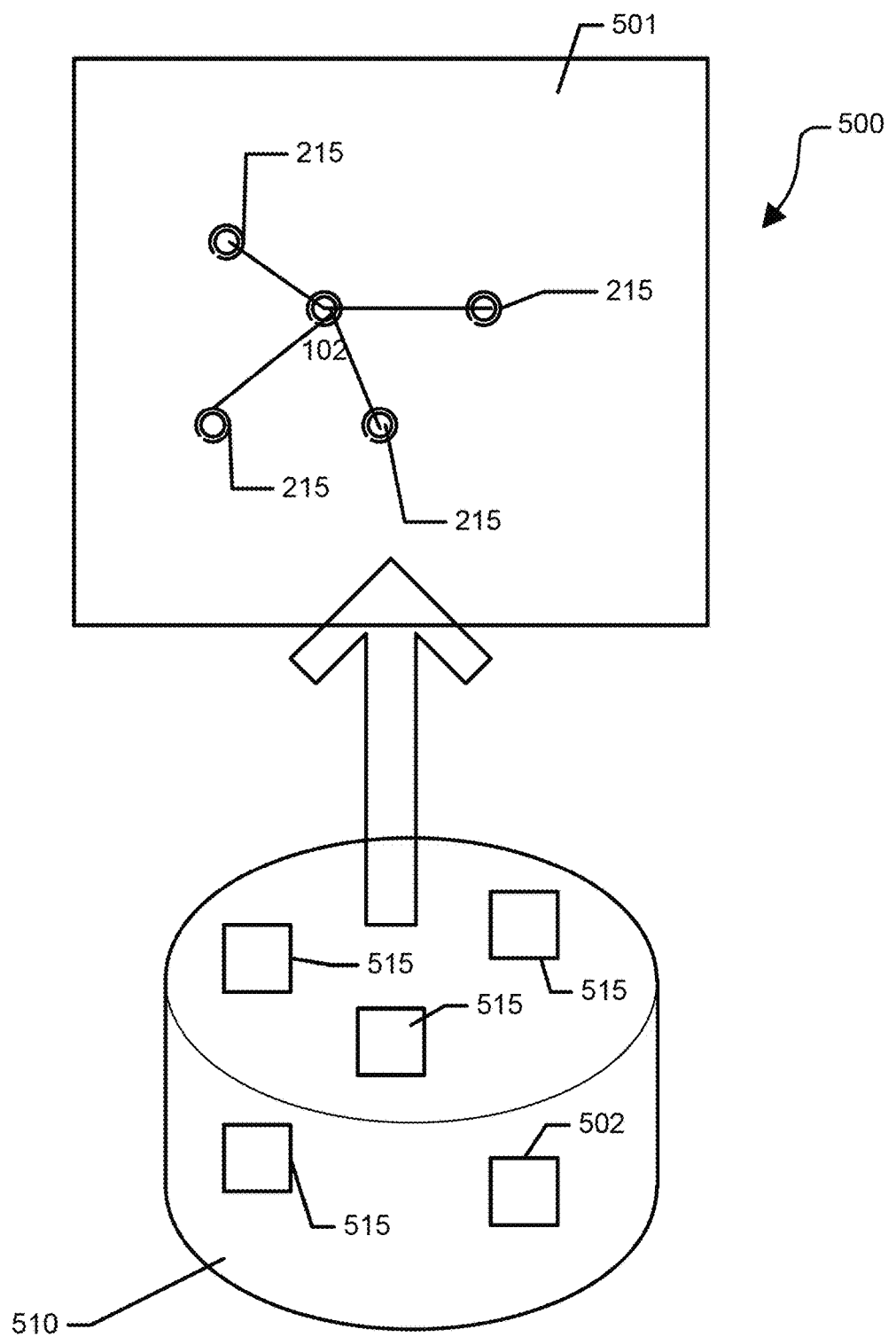
FIG. 5 is a diagrammatic representation of an example of a test environment.

FIG. 5 shows a test environment 500 based on the example provided in FIG. 3. As shown, test environment 500 is configured to test webpage 102 and includes test bench 501 and repository 510, or access thereto. To this end of testing webpage 102, as shown in test bench 501, webpage 102 is tested in the context of webpages 215 directly referenced by the hyperlinks of webpage 102, as shown. Repository 510 contains templates representing webpages: templates 515 represent webpages 215, while template 502 represents webpage 102.

A web designer may develop or test webpage 102 in test environment 500. Webpage 102 is instantiated from template 502. Webpages 215 associated with test webpage 102 are instantiated from templates 515, and the web developer can determine if webpage 102 functions as desired in the context of webpages 215.

Once an update or change is made to a webpage, for example webpage 102, the update or change may be propagated to repository 510 by updating or changing a template associated with the webpage, for example, webpage 502. Thus, repository 510 is dynamically updated with the current states and configurations of webpages upon a change or update to the webpage by updating the respective template. This allows for webpages to be accurately tested against each other using webpages instantiated from templates in repository 510.

Test environment 500 may be implemented by one or more virtual machines provisioned on a virtual infrastructure. For example, a virtual machine may host the webpage under test, a virtual machine may manage the repository, and a further virtual machine may manage components of webpages. Furthermore, virtual machines may be used to host the webpages interfacing with the webpage under test.

Because repository 510 is dynamically updated with regard to webpage changes and maintains a library of templates representing webpages, a webpage may be virtually tested against other webpages referenced by the hyperlink components of the webpage, thereby allowing for test of the webpage prior to deployment of the webpage to the web environment hosting the webpage. Webpages deployed to the web environment for hosting may have corresponding representations thereof, such as template 401 of FIG. 4, stored in the repository and may be used to test other webpages prior to deployment of those webpages. Thus, changes to webpages may be dynamically propagated to the repository such that webpages may be accurately developed and tested against dynamically updated webpage templates stored in the repository.

Figure 6:
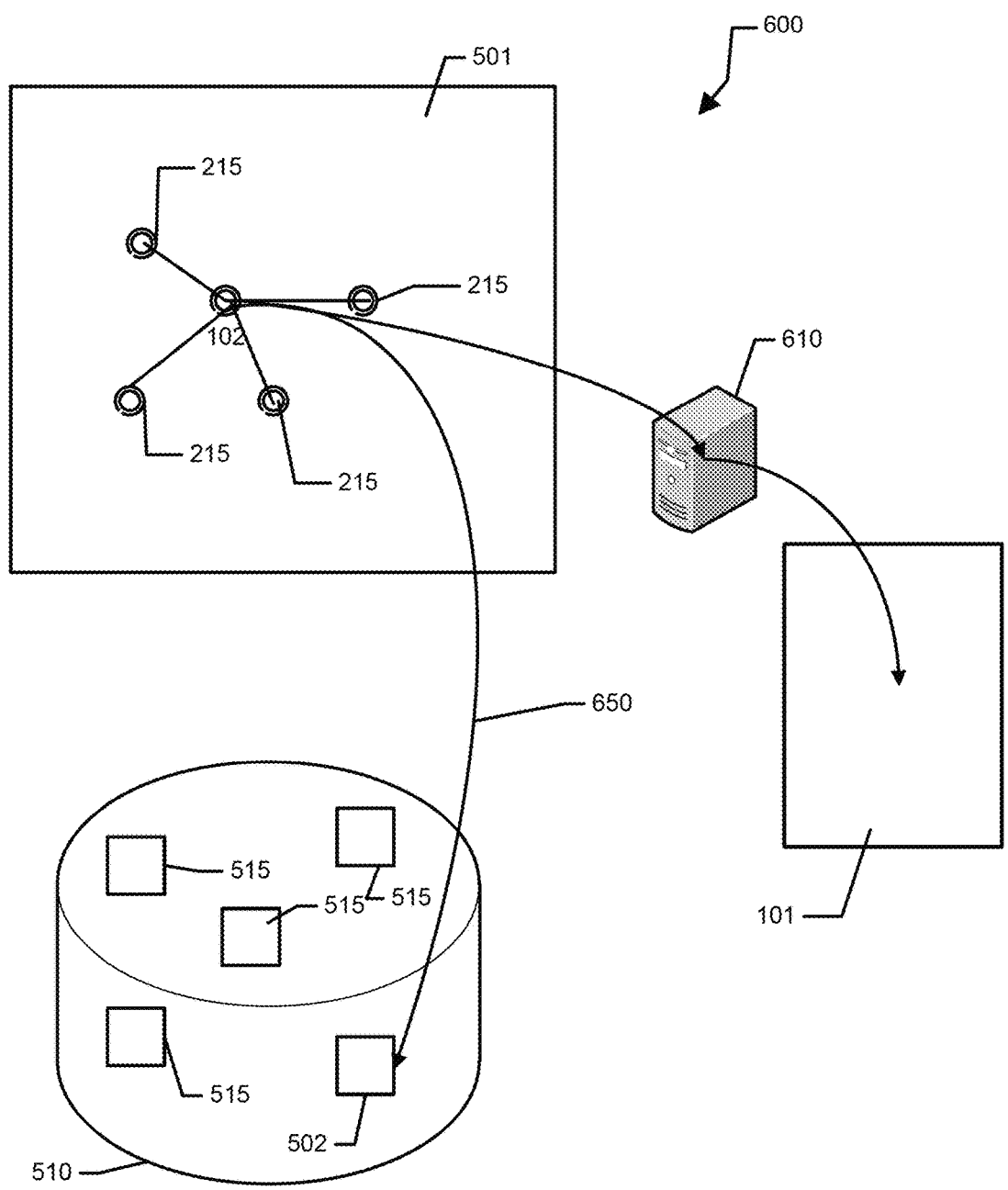
FIG. 6 is a diagrammatic representation of an example of a test and deployment environment.

FIG. 6 shows a test and deployment environment 600. Test and deployment environment 600 includes test bench 501 and repository 510, or access thereto. Test and deployment environment 600 further includes a proxy 610 coupling test bench 501 to website 101 from FIG. 1. A webpage may be deployed from test bench 501 to be hosted on website 101 via proxy 610. Once the webpage has been deployed for access by internet browsers onto the website, then the corresponding template in repository 510 may be updated with the information of the deployed webpage such that repository 510 maintains templates accurately representing deployed webpages, so that webpages may be tested using webpages correctly corresponding to deployed webpages.

More particularly, as shown in 600 and discussed above with regard to FIG. 5, webpage 102 is instantiated from template 502 and is being tested against webpages 215, instantiated from templates 515. Once web page 102 has been virtually tested with test bench 501, and deployed to website 101 via proxy 610 (as shown by the associated directional arrows), template 502 may be updated in repository 510 with any changes to webpage 102, as shown by update arrow 650. Thus, template 502 will be an updated representation of webpage 102 as deployed to a web environment, and may be used in test bench 501 to test other webpages, such as webpages 215, which have direct links to webpage 102 represented by template 502 in repository 510.

As further illustrated in environment 600, test bench 501 as well as repository 510 are isolated from website 101 by proxy 610; thus webpages are virtually tested and developed in isolation from deployment. Thus, developing and testing webpages with embodiments described herein avoids interfering with an operational website during development and test of webpages.

Figure 7:
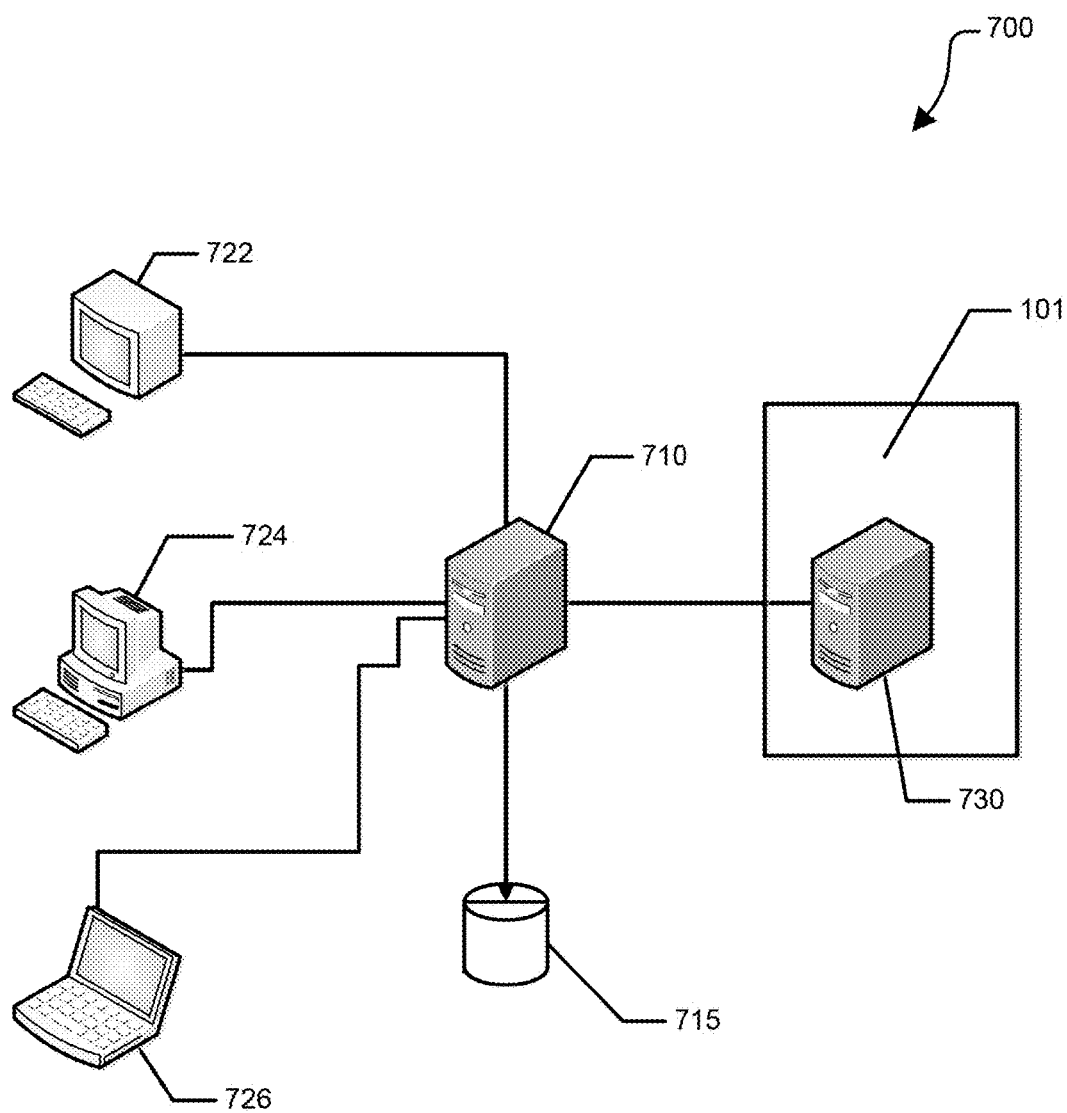
FIG. 7 is a diagrammatic representation of an example of a computer system operable to host a test environment.

FIG. 7 shows a computer system 700 that may be used to implement the test system described herein. Server 710 may host the virtual test environment as described herein, including a virtual test bench. Server 710 is in communication with repository 715 which stores templates representing webpages as described herein. Server 710 may access these stored templates in repository 715 and instantiate corresponding virtual webpages in a virtual test environment, as described herein. Developer computers 722, 724, and 726 are in communication with server 710 and may be operated by webpage developers to test and develop webpages in the virtual test environment hosted by server 710.

Server 710 is further in communication with server 730. As shown, server 730 hosts website 101 of FIGS. 1, 2, and 6. One or more of developer computers 722, 724, and 726 may indicate to server 710 that a webpage should be deployed to server 730 to be hosted as a webpage of website 101 hosted by server 730. Server 710 may then deploy a webpage to server 730 for hosting as part of website 101. Server 710 may further update a template in repository 715 from which the deployed webpage was instantiated. Server 710 may update the template with new or changed properties of the deployed webpage such that the associated template in the repository reflects the properties of the deployed webpage.

Repository 715 may contain a library of templates, each template associated with a respective webpage of a website. The templates may be versioned, and a set of versioned templates may be associated with a webpage, such that the library tracks changes to webpages. Furthermore, the test environment described herein may have check-in-triggers such that when a webpage is checked-in to the test environment by a developer, any changes to the webpage are propagated to the repository library as changes to the respective template, such that the repository maintains a dynamically updated library of templates representing deployed webpages. Dynamically updating the templates in the repository and allows for real-time updates to the templates so that the templates accurately represent deployed webpages.

Versioning templates to maintain a historical record of webpages allows for the test environment to provide historical webpage data. Furthermore, versioning of templates allows historical webpage configurations to be recreated. An advantage of the test environment as described herein is that a webpage may be comprehensively tested in the context of a website prior to deploying the webpage to the website. By testing a webpage in isolation from the web environment to host the webpage, webpage failure in the context of the web environment may be avoided. That is, since the functionality of the webpage is confirmed prior to deployment to a website, deployment of the webpage will not cause the active website to fail. Furthermore, the virtual test environment described herein allows for a webpage to be tested against different web environments prior to deployment to one or more of the web environments.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A test system comprising:
an information handling system having a repository including a set of representations of webpages associated with a website, the set of representations of webpages stored in the repository as templates in a template library;
a proxy; and
a virtual test bench isolated from the website by the proxy, wherein the test system is configured to:
instantiate a first webpage from a corresponding first representation of the set of representations of webpages in the virtual test bench, the first webpage having a set of link components referencing a set of second webpages, each of the second webpages having a corresponding second representation in the set of representations of webpages and directly linked to the first webpage by one of the link components to directly connect the second webpages to the first webpage;
instantiate each of the second webpages from corresponding second representations in the virtual test bench, wherein the first and second webpages are hosted on a virtual machine;
confine testing of the first webpage to the first webpage and the set of link components in the virtual test bench;
deploy the first webpage to a website via the proxy when testing the first webpage is complete; and
update the first representation in the repository with a first change made to the first webpage in the virtual test bench in response to deploying the first webpage.

2. The test system of claim 1, wherein changes to the templates are versioned in the template library.

3. The test system of claim 1, wherein the first representation is updated in the repository with the first change subsequent to deployment of the first webpage to the website.

4. A server hosting a virtual test bench isolated from a website by a proxy, wherein the virtual test bench is configured to at least:
access a database hosting a library of templates;
instantiate a first webpage from a corresponding first template in the library of templates corresponding to the website, the first webpage including a set of link components referencing a set of second webpages, each of the second webpages having a corresponding second template in the library of templates and directly linked to the first webpage by one of the link components to directly connect the second webpages to the first webpage;
instantiate each of the second webpages from corresponding second templates, wherein the first and second webpages are hosted on a virtual machine;
confine testing of the first webpage to the first webpage and the set of link components in the virtual test bench;
deploy the first webpage to a website via the proxy when testing of the first webpage is complete; and
update the first template in the library with a first change made to the first webpage in response to deploying the first webpage.

5. The server of claim 4, wherein the first template is given a version based on the first change.

6. The server of claim 4, wherein the first template is updated with the first change subsequent to deployment of the first webpage to the website.

* * * * *